United States Patent [19]

Diggs

[11] 3,995,436
[45] Dec. 7, 1976

[54] APPARATUS FOR UNIFORM DISPERSION OF DIGESTED EFFLUENT

[76] Inventor: Richard E. Diggs, 12A Road, Carthage, Mo. 64836

[22] Filed: Mar. 13, 1975

[21] Appl. No.: 558,079

[52] U.S. Cl. .................................. 61/13; 210/170
[51] Int. Cl.² ........................................ E02B 13/00
[58] Field of Search ................... 61/13, 12, 10, 11; 210/170

[56] References Cited
UNITED STATES PATENTS

| | | |
|---|---|---|
| 728,088 | 5/1903 | Dillon ................................. 61/13 |
| 3,292,378 | 12/1966 | Rosenthal et al. ..................... 61/13 |
| 3,426,544 | 2/1969 | Curtis ................................. 61/13 |
| 3,518,831 | 7/1970 | Tibbals, Jr. et al. ................... 61/13 |
| 3,604,728 | 9/1971 | Blass et al. ......................... 61/12 X |
| 3,620,023 | 11/1971 | Schmid ................................ 61/13 |
| 3,762,170 | 10/1973 | Fitzhugh .............................. 61/13 |

Primary Examiner—Jacob Shapiro
Attorney, Agent, or Firm—Shoemaker and Mattare, Ltd.

[57] ABSTRACT

An apparatus for effecting uniform dispersion of digested effluent, includes a header pipe connected with a source of digested effluent under pressure, and a plurality of effluent discharge pipes connected with the header pipe, and a plurality of flow control effluent emitters are connected with the discharge pipes at spaced intervals therealong to effect uniform dispersion of the digested effluent in a disposal field and the like. The emitters are provided in different sizes and the effluent is pumped therethrough. The apparatus can thus be used in hilly terrain and will provide uniform dispersion of the effluent regardless of high or low ground elevations. The apparatus can be used to irrigate crops or lawns and the like, and thus the digested effluent is a valuable asset rather than a liability.

8 Claims, 9 Drawing Figures

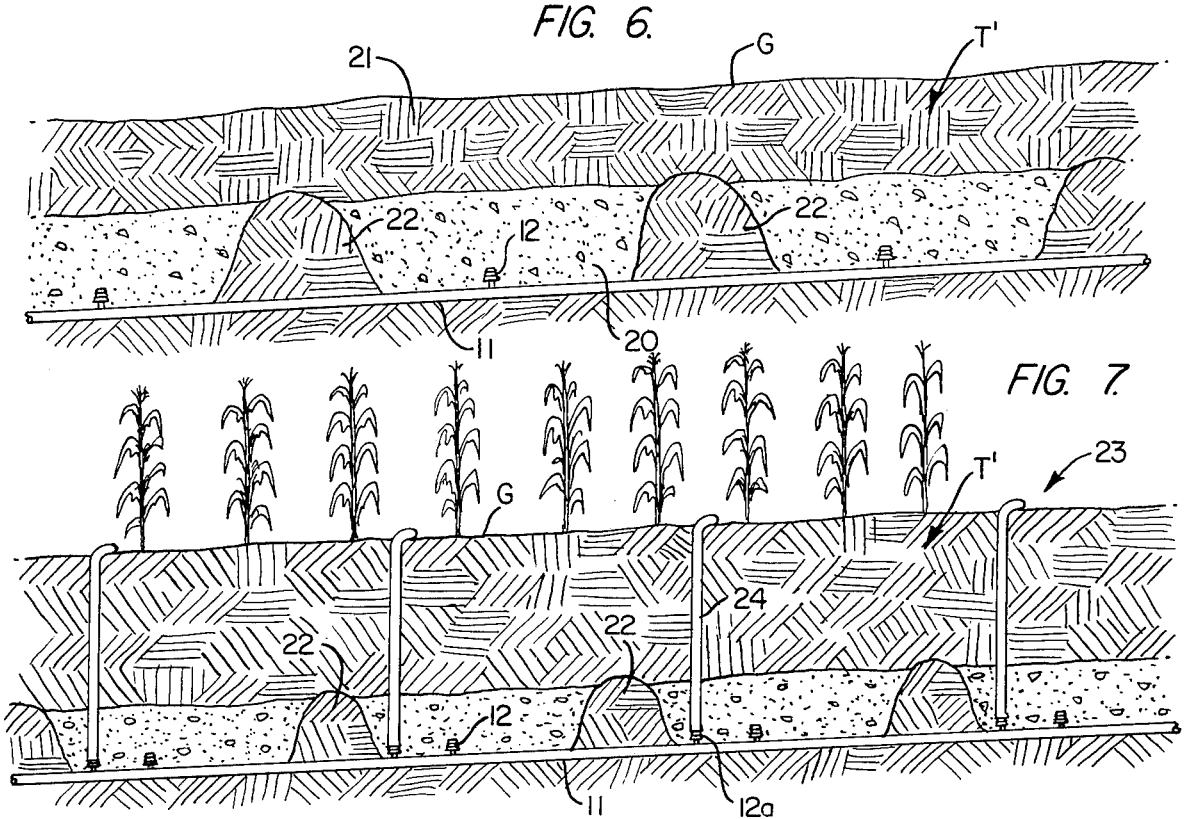
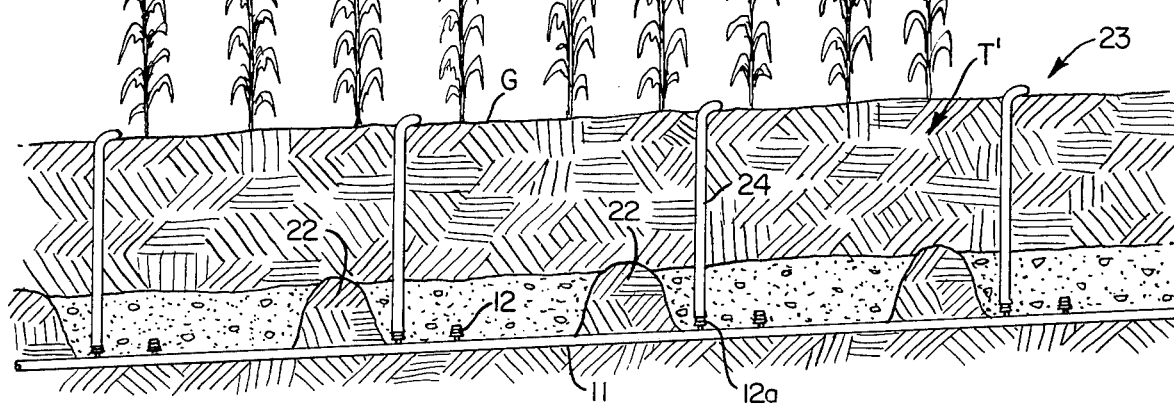
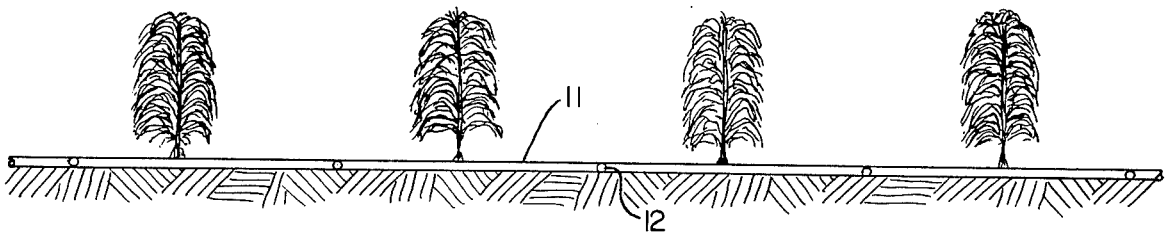
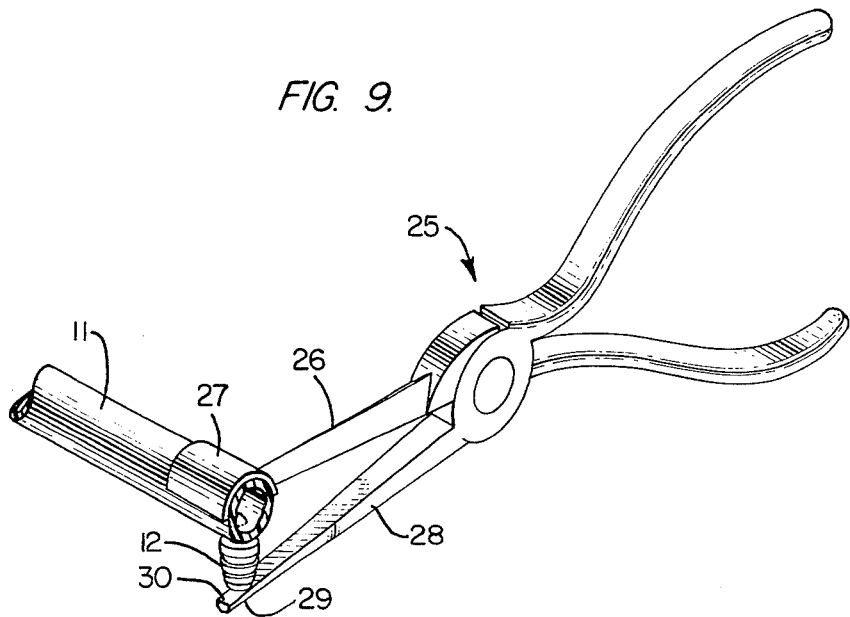

APPARATUS FOR UNIFORM DISPERSION OF DIGESTED EFFLUENT

BACKGROUND OF THE INVENTION

This invention relates to means for disposing of sewage waste materials, and particularly to such a means which renders the disposal of such materials compatible with environmental protection laws and other laws which prohibit underground raw sewage disposal.

More particularly, the present invention relates to a means including a sewage digesting device which receives raw sewage and digests it, and the digested effluent is conveyed under low pressure to a plurality of discharge pipes arranged in a disposal field or the like, whereby the digested effluent can be disposed of in the field or used to irrigate crops or lawns or the like as desired. The invention can be used for both small and large applications, such as, for example, a single mobile home or a large city and the like.

Heretofore, underground disposal fields have been a severe problem, in that they require pipe 4 inches to 6 inches in diameter, with ¾ inch holes at certain points therealong, and the flow of effluent through these pipes is effected by the influence of gravity only. Since the topography is seldom ideal, these prior art arrangements have resulted in a non-uniform distribution of the sewage or effluent, often occasioned by surfacing of unprocessed effluents, thus causing a health hazard in addition to the undesirability of having wet, soggy areas in the disposal field. Because of these problems, prior art disposal fields are very short lived and are expensive to establish and maintain, due to the large diameter of pipe required to handle undigested material under gravity flow conditions.

With the present invention, small diameter, inexpensive plastic pipe or tubing under low pressure is utilized to obtain a highly uniform flow and emission pattern of digested effluent in a much smaller area, thus resulting in about an 80% reduction in cost of the disposal field and related equipment. Moreover, the apparatus of the invention is operated under positive pressure, and includes a plurality of emitters having different size orifices therethrough if the terrain is hilly, for example, whereby emitters with larger orifices are placed at higher elevations to thus obtain a substantially uniform flow throughout the disposal field regardless of the topography of the disposal field.

Still further, since the sewage is thoroughly and completely digested and liquified by the digester used with the apparatus of the invention, the effuent can be used for irrigation of lawns, shrubs, trees, parks or agricultural crops and the like, and the effluent, therefore, is a valuable asset rather than an expensive liability. Additionally, the emitters have sharpened points whereby they may be inserted directly into the discharge conduits by the use of a simple and inexpensive tool, whereby costly engineering and planning is eliminated and field installation of the discharge pipes and emitters can easily and quickly be accomplished.

OBJECTS OF THE INVENTION

Accordingly, it is an object of this invention to provide an apparatus for effecting uniform dispersion of digested effluent, such that treated or digested sewage can be disposed of in a uniform manner, and without regard to the topography of the area over which the effluent is discharged.

Another object of the invention is to provide a low cost and easy to install apparatus for effecting uniform dispersion of digested effluent, wherein the apparatus includes flow control emitters having different size orifices therethrough and sharpened points thereon, such that the apparatus can be quickly and easily assembled in the field and does not require expensive engineering and planning.

A further object of this invention is to provide an installing tool for rapid and easy installation of the emitters to the discharge pipes according to the invention.

Yet another object of the invention is to provide an apparatus whereby raw sewage is converted into a digested effluent substantially liquid in form, and the digested effluent is utilized for irrigation of lawns, crops and the like, and thus the effluent is made a valuable asset rather than being an expensive liability, as in the prior art.

BRIEF DESCRIPTION OF THE DRAWINGS

FIG. 1 is a schematic plan view of an apparatus in accordance with the invention, showing the disposal field having various elevations, and with the apparatus used to dispose of the sewage from a city or the like.

FIG. 6 is a view similar to FIG. 5, with the trench disposed on an incline, and showing earthen dams to prevent pooling of the discharged effluent.

FIG. 7 is a view similar to FIG. 6, with the discharge conduits disposed in an area for irrigation of crops, and with surface conduits extending from the discharge conduit to the surface of the ground for simultaneous subsurface and surface irrigation.

FIG. 8 is a view of a further arrangement of the invention, wherein the discharge conduits and emitters are disposed on the surface of the ground for use in irrigation.

FIG. 9 is an enlarged, perspective view of an emitter installing plier according to the invention, shown in operative association for installing an emitter to a discharge pipe or conduit.

DETAILED DESCRIPTION OF THE INVENTION

Figure 1:
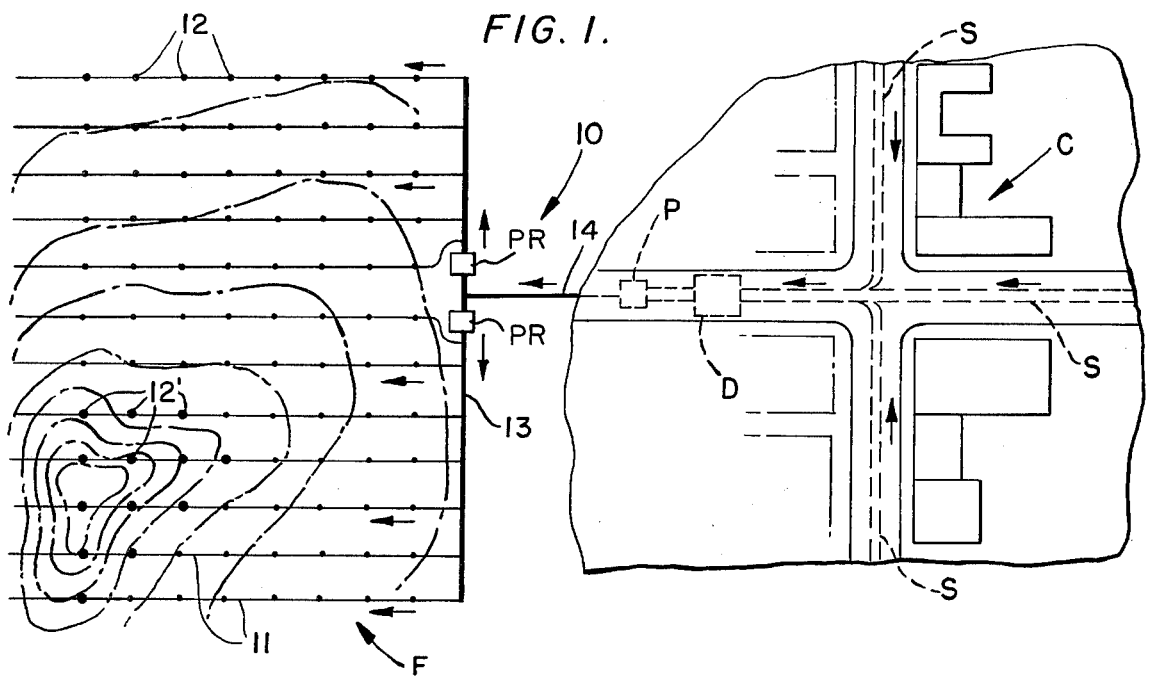

In the drawings, wherein like reference numerals indicate like parts throughout the several views, an apparatus in accordance with the invention is indicated generally at 10 in FIG. 1 and comprises a plurality of substantially parallel, elongate discharge pipes or conduits 11 extending into a disposal field F or the like or into an area of crops or the like to be irrigated, and the discharge pipes 11 each have a plurality of effluent flow control emitters 12 attached thereto at spaced intervals along the length thereof. As seen in this figure, the topography of the field is such that it has a point of higher elevation in relation to the remainder of the field, and emitters 12' having larger flow control orifices therethrough are provided at the higher elevation to obtain a substantially uniform dispersion of the effluent throughout the disposal field.

The discharge pipes or conduits 11 are connected at one of their ends with a header pipe 13, which is in turn connected between its ends with pressure regulators PR, and a supply pipe 14 extending from a pump P, which receives digested effluent from an airwheel oxygen digester D connected to receive raw sewage from a sewer system S of a city or the like C. The digester D and arrangment with pump P are more fully disclosed in my copending Application, Ser. No. 561,877, filed Mar. 25, 1975. Preferably, the header pipe 13 comprises PVC plastic having a 2 inch diameter, and the discharge pipes 11 connected therewith comprise polyethylene plastic having a ¾ inch diameter. Also, the emitters 12 and 12', as noted previously, have different size orifices therethrough and preferably there are five different size orifices and the emitters are color coded for the different orifice sizes so that selection and installation thereof is or may be rapidly accomplished.

Figure 2:
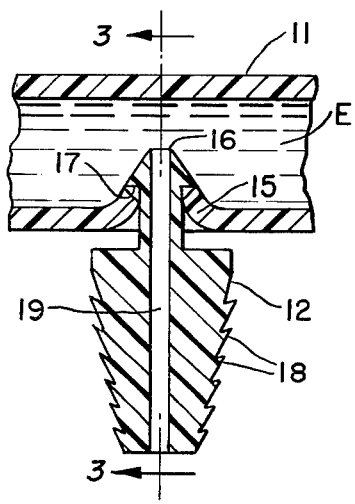
FIG. 2 is a greatly enlarged, fragmentary, longitudinal sectional view of a portion of one of the discharge conduits and an emitter assembled thereto.
Figure 3:
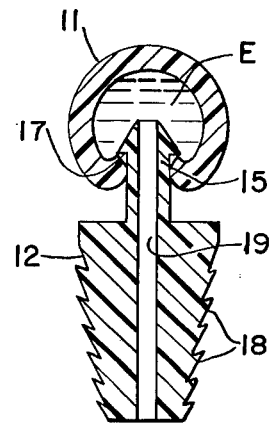
FIG. 3 is a greatly enlarged, transverse sectional view of one of the discharge conduits and an emitter assembled thereto.

As seen in FIGS. 2 and 3, the emitters 12 have a piercing projection 15 on one end thereof, with a tapered, sharpened end 16 defining an axially rearwardly facing retaining shoulder 17, whereby the piercing end may be forced through the wall of a pipe 11 and the retaining shoulder 17 will engage the inner surface of the wall of the pipe to retain the emitter 12 in position. The other end of the emitter is tapered and has a plurality of annular serrations 18 on the outer surface thereof, whereby different size conduits or tubing may be inserted over the serrations 18, and the serrations will engage and securely grip the inner surface of the end of the pipe inserted thereover. A flow control orifice 19 extends throughout the length of the emitter 12 for contolling the rate of flow of effluent E from the pipe 11 through the emitter and to an area to be irrigated or into a disposal field for disposal of the effluent.

Figure 4:
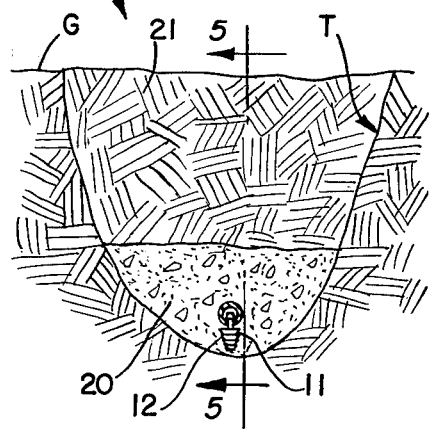
FIG. 4 is a transverse sectional view of a trench in a disposal field having a discharge pipe and emitter disposed therein.
Figure 5:
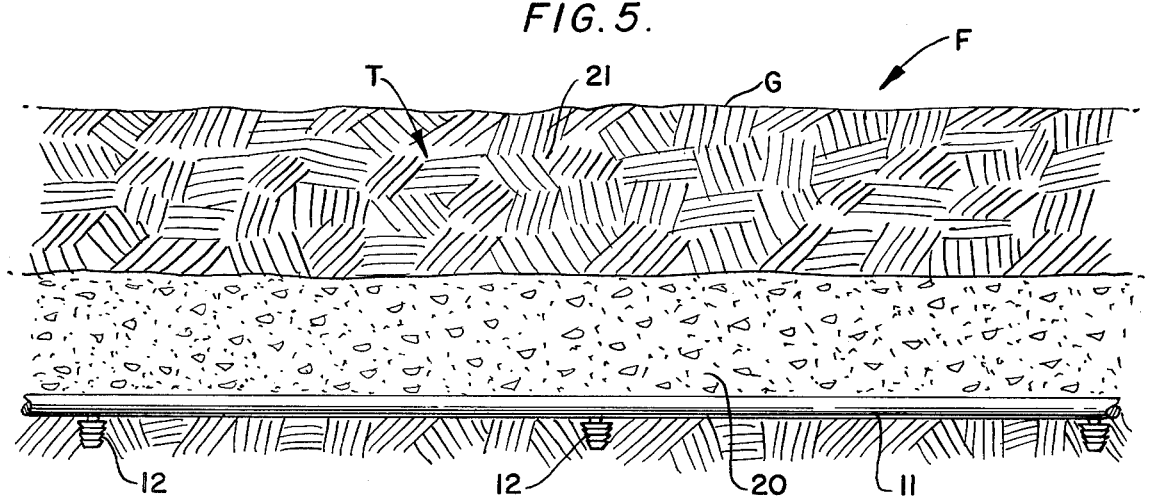
FIG. 5 is a longitudinal, sectional view taken along line 5—5 in FIG. 4.

In FIG. 4, a trench T is formed in the ground G, as for example, in a disposal field F or area to be irrigated, and the bottom portion of the trench is filled with gravel and the like 20, and the flow discharge pipe 11 with emitters 12 attached thereto is disposed in the gravel and the like 20 and dirt or the like 21 is then placed on top of the gravel and the like 20, filling the trench and sealing the trench.

In FIG. 6, the discharge pipe 11 and emitters 12 are shown disposed in a trench T', which is situated on an incline, and a plurality of spaced apart earthen dams 22 are provided in the trench T' at predetermined intervals therealong to prevent flow of discharged effluent along the trench to low elevations and thus prevent pooling of the discharged effluent at the low elevations.

In FIG. 7, a further modification of the apparatus is indicated generally at 23, and in this figure the discharge pipe 11 is disposed in an inclined trench T', as in FIG. 6, and earthen dams 22 are also provided. However, in this figure surface pipes or tubes 24 are connected with selected emitters 12a or other suitable fittings, and the surface pipes or tubes 24 are extended to the surface of the ground G, such that the emitters 12 disposed in the trench T' effect subsurface irrigation, while the surface tubes or pipes 24 effect surface irrigation of plants or crops to be irrigated.

In FIG. 8, an arrangement is shown wherein the apparatus is used for irrigation only, and in this arrangement the discharge pipes 11 are disposed directly on the surface, such as, for example, on a lawn or field or other area to be irrigated, whereby the emitters 12 discharge the digested effluent directly onto the surface of the ground.

In FIG. 9, an emitter installing tool is indicated generally at 25, an essentially comprises a modified long nose or needle nose plier, wherein one jaw 26 thereof has an arcuate, generally semicylindrical backup plate 27 affixed thereto, and the other jaw 28 has a generally rounded or semicylindrical surface configuration 29 and an inner, generally flat, planar, emitter-engaging surface 30, whereby an emitter 12 may be positioned between the surface 30 and one side of a pipe 11, with the sharpened end of the emitter disposed against the side of the pipe 11, and the backup plate 27 disposed on the side of the pipe opposite the emitter, and the plier then operated to urge the jaws together to force the sharpened point of the emitter through the side wall of the pipe 11.

Thus, with the present invention a simple and inexpensive apparatus is provided for the disposal of sewage, and wherein raw sewage is converted or digested into a harmless, liquified effluent, which is then dispersed in a uniform manner over an area to be irrigated or in a disposal field, as desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. Apparatus for effecting uniform dispersion of digested effluent, comprising header pipe means connected with a source of digested effluent under positive pressure, a plurality of effluent discharge pipes each connected at one of their ends with the header pipe means and extending therefrom in generally perpendicualar relation to the header pipe means into an area for discharge of the effluent, and a plurality of separate flow control emitters individually connected with the discharge pipes at selected, spaced apart locations along the length of the discharge pipes, said emitters having a piercing point on one end thereof penetrating the discharge pipes and connecting the emitters to the discharge pipes and having an exterior tubing connecting surface on the other end thereof for engagement thereover of an end of a tube to attach the tube thereto, elongate tubes engaged at one end with the tubing connecting surface on selected emitters for receiving flow from the emitters, said emitters having individual, predetermined, various size flow control orifices therethrough to obtain a desired flow rate of digested effluent from each emitter, said apparatus thus usable on either flat or hilly terrain to obtain a uniform dispersion of digested effluent.

2. Apparatus as in claim 1, wherein the discharge pipes extend into terrain of uneven elevation, and the emitters have different size orifices therethrough, with emitters having larger orifices at higher elevations, to obtain uniform flow from the emitters regardless of the elevation.

3. Apparatus as in claim 1, wherein the discharge pipes lie on the surface of the ground for irrigation of crops and the like.

4. Apparatus as in claim 1, wherein a pump means is connected with the source of digested effluent for placing the effluent under positive pressure, a supply pipe connected at one end with the pump means and connected at its other end with the header pipe means between the ends of the header pipe means, said plurality of discharge pipes being connected to the header pipe means on opposite sides of the juncture with the supply pipe, and a pressure regulator in the header pipe means on each side of the juncture with the supply pipe to regulate pressure of effluent flowing to the discharge pipes.

5. Apparatus as in claim 4, wherein the header pipe means comprises polyvinyl chloride plastic and has a 2 inch diameter, and the discharge pipes comprise polyethylene plastic and each has a 3/4 inch diameter.

6. Apparatus as in claim 2, wherein the emitters are different colors for different sizes.

7. Apparatus as in claim 1, wherein the tubing connecting surface on the emitters comprises a frustoconically tapered surface with a plurality of circumferential, annular serrations thereon.

8. Apparatus for effecting uniform dispersion of digested effluent, comprising header pipe means connected with a source of digested effluent under positive pressure, a plurality of effluent discharge pipes each connected at one of their ends with the header pipe means and extending therefrom in generally perpendicular relation to the header pipe means into an area for discharge of the effluent, said discharge pipes disposed in inclined trenches, said trenches having gravel and the like in the bottom thereof and the discharge pipes disposed in the gravel, and dirt on top of the gravel filling and sealing the trench, earth dams traversing the trenches at spaced intervals to prevent the discharged effluent from flowing along the inclined trenches and pooling at low elevations thereof, and a plurality of separate flow control emitters individually connected with the discharge pipes at selected, spaced apart locations along the length of the discharge pipes, said emitters having a piercing point on one end thereof penetrating the discharge pipes and connecting the emitters to the discharge pipes and having an exterior tubing connecting surface on the other end thereof for engagement thereof of an end of a tube to attach the tube thereto, said emitters having individual, predetermined, various size flow control orifices therethrough to obtain a desired flow rate of digested effluent from each emitter, said apparatus thus usable on either flat or hilly terrain to obtain a uniform dispersion of digested effluent.

* * * * *